United States Patent
Hansmeier et al.

(10) Patent No.: US 11,749,485 B2
(45) Date of Patent: Sep. 5, 2023

(54) MODULAR SWITCH APPARATUS FOR CONTROLLING AT LEAST ONE ELECTRIC DRIVE

(71) Applicant: Phoenix Contact GmbH & Co. KG, Blomberg (DE)

(72) Inventors: Stephan Hansmeier, Bad Salzuflen (DE); Bernd Schulz, Höxter (DE); Matthias Ragaller, Bad Lippspringe (DE); Dirk Plewka, Nieheim (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 267 days.

(21) Appl. No.: 17/297,134

(22) PCT Filed: Nov. 26, 2019

(86) PCT No.: PCT/EP2019/082531
§ 371 (c)(1),
(2) Date: May 26, 2021

(87) PCT Pub. No.: WO2020/109285
PCT Pub. Date: Jun. 4, 2020

(65) Prior Publication Data
US 2022/0139659 A1     May 5, 2022

(30) Foreign Application Priority Data

Nov. 26, 2018   (BE) .................................. 2018/5827

(51) Int. Cl.
*H01H 89/06*     (2006.01)
*G05B 9/02*      (2006.01)
(Continued)

(52) U.S. Cl.
CPC ............... *H01H 89/06* (2013.01); *G05B 9/02* (2013.01); *H02P 1/023* (2013.01); *H02P 1/16* (2013.01); *H02P 5/74* (2013.01); *H02P 6/04* (2013.01)

(58) Field of Classification Search
CPC ........ H01H 89/06; G05B 9/02; G05B 19/042; H02P 1/023; H02P 1/16; H02P 5/74; H02P 6/04; H01R 9/2658
(Continued)

(56) References Cited

U.S. PATENT DOCUMENTS 7,116,069 B1 * 10/2006 Holterman ......... G05B 19/0428
                                                       318/700
2014/0203750 A1   7/2014 Aufschneider et al.

FOREIGN PATENT DOCUMENTS

| DE | 19616516 C1 | 7/1997 |
| DE | 19610559 A1 | 9/1997 |

(Continued)

OTHER PUBLICATIONS

Authorized Officer: Nora Lindner, International Report on Patentability issued in counterpart PCT application No. PCT/EP2019/082531, dated May 25, 2021, 6 pp.

(Continued)

*Primary Examiner* — David Luo
(74) *Attorney, Agent, or Firm* — KAPLAN BREYER SCHWARZ, LLP

(57) ABSTRACT

A modular switch apparatus for controlling at least one electric drive includes a mounting rail bus system having a control line and two power supply lines, a power supply device, and a safety relay module that is configured to obtain a first, high level control signal from a DC supply voltage applied to the two power supply lines and to feed the first control signal to the control line via the first bus interface if (Continued)

the emergency stop command device has not been actuated. Furthermore, at least one safety motor starter module is provided, which includes a processing device with an input that can be electrically connected to the control line via a bus interface. The processing device is adapted to evaluate a first, high level control signal as transferred via the control line and to provide control signals for controlling the at least two switch devices.

8 Claims, 4 Drawing Sheets

(51) Int. Cl.
    *H02P 1/02* (2006.01)
    *H02P 1/16* (2006.01)
    *H02P 5/74* (2006.01)
    *H02P 6/04* (2016.01)

(58) Field of Classification Search
    USPC .................................................. 318/490, 558
    See application file for complete search history.

(56) References Cited

FOREIGN PATENT DOCUMENTS

| | | |
|---|---|---|
| DE | 19651961 A1 | 6/1998 |
| DE | 19718996 C1 | 6/1998 |
| DE | 19748429 A1 | 5/1999 |
| DE | 19710768 C2 | 11/1999 |
| DE | 69702063 T2 | 2/2001 |
| DE | 10102316 A1 | 7/2002 |
| DE | 202006006659 U1 | 7/2006 |
| DE | 102007050943 A1 | 4/2009 |
| DE | 102007061610 B4 | 1/2010 |
| DE | 102010016865 A1 | 11/2011 |
| DE | 202011000835 U1 | 11/2011 |
| DE | 102011001274 A1 | 9/2012 |
| DE | 102011110183 B3 | 11/2012 |
| DE | 202014102739 U1 | 6/2014 |
| DE | 102013111577 A1 | 4/2015 |
| DE | 202016101373 U1 | 3/2016 |
| DE | 102015104290 A1 | 9/2016 |
| EP | 0909472 B1 | 5/2000 |
| EP | 1137334 A2 | 9/2001 |
| EP | 0896504 B1 | 4/2003 |
| EP | 2727125 B1 | 9/2015 |
| EP | 2506692 B1 | 6/2017 |
| EP | 1589386 B1 | 1/2018 |
| WO | 2017/153507 A1 | 9/2017 |
| WO | 2017/153531 A1 | 9/2017 |
| WO | 2018/055078 A1 | 3/2018 |

OTHER PUBLICATIONS

Authorized Officer: Socher, Gunther, International Search Report issued in counterpart PCT application No. PCT/EP2019/082531, dated Jan. 31, 2020, 4 pp.

Office Action issued in corresponding German patent application No. 102018129765.3, dated Aug. 13, 2019, 20 pp. w/ translation.

Search Report issued in corresponding Belgian patent application No. BE2018/5827, dated Aug. 1, 2019, 12 pp. w/ translation.

* cited by examiner

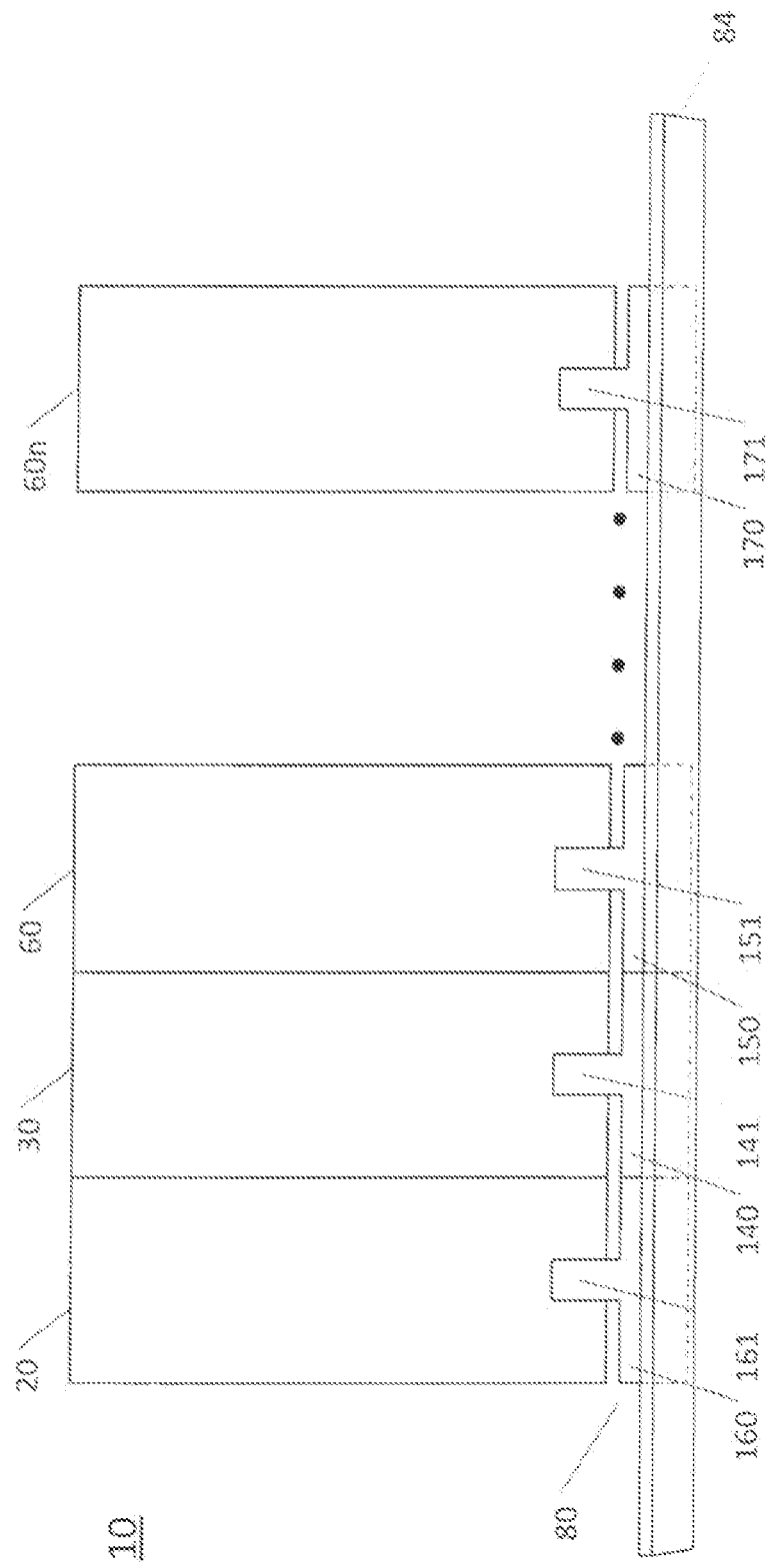

MODULAR SWITCH APPARATUS FOR CONTROLLING AT LEAST ONE ELECTRIC DRIVE

FIELD

The invention relates to a modular switch apparatus for controlling at least one electric drive, which modular switch apparatus can in particular be employed in an industrial automation system.

BACKGROUND

A safety motor starter is known from EP 2 727 125 B1, for example. The safety motor starter comprises a safety evaluation unit and a safety switch unit, and connectable to the safety switch unit is a power supply network and a motor, for example. Moreover, the safety switch unit comprises two switching elements connected in series. The safety evaluation unit is connectable to an emergency stop button. The safety evaluation unit and the safety switch unit can be mechanically and electrically coupled to a connection module, and a control command triggered by actuation of the emergency stop button can be transmitted from the safety evaluation unit to the safety switch unit via the connection module. In response to the control command, a processing unit of the safety switch unit controls the switching elements accordingly, so that the motor can be disconnected from the power supply network.

A process control is known from EP 1 589 386 B1, in which process signals from a process module and safety signals from a safety module are logically combined, and the result of the logical combination is made available at a control output of a control unit to which a process device to be controlled is connected. The process module and the safety module communicate with the control unit via a common communication system.

SUMMARY

The invention is based on the object of creating a modular switch apparatus for controlling at least one electric drive, which is scalable in a simple and cost-effective way and can be wired in a simple manner.

The technical problem mentioned above is solved by the features of claim 1.

Accordingly, a modular switch apparatus is provided for controlling at least one electric drive, the modular switch apparatus having the following features:
a mounting rail bus system comprising a mounting rail and at least two bus connectors, namely a first and a second one, wherein the at least two bus connectors are adapted to be coupled to one another electrically and mechanically and to be arranged in the mounting rail and, in their mounted state, contain a control line and two power supply lines, wherein each of the at least two bus connectors has a module interface;
a power supply device that is adapted to apply a DC supply voltage to the two power supply lines of the mounting rail bus system;
a safety relay module with the following features:
a first connection element to which an emergency stop command device is connectable;
a first bus interface which is adapted to be electrically connected to the module interface of the first bus connector, wherein, in the connected state, the safety relay module is electrically connected to the two power supply lines and to the control line of the mounting rail bus system; wherein the safety relay module is adapted to obtain a first, high level control signal from a DC supply voltage applied to the two power supply lines and to feed the first control signal to the control line via the first bus interface, if the emergency stop command device has not been actuated;
at least one safety motor starter module with the following features:
a second bus interface that is adapted to be electrically connected to the module interface of the second bus connector, wherein, in the connected state, the safety motor starter module is electrically connected to the two power supply lines and to the control line of the mounting rail bus system;
a second connection element to which a power supply device is connectable for providing a supply voltage for an electric drive;
a third connection element for connecting an electric drive;
at least one current path including at least two series-connected switch devices provided between the second and third connection element; and
a processing device having an input that is electrically connectable to the control line via the second bus interface, the processing device being adapted to evaluate a first, high level control signal that is transferred via the control line and to provide control signals for controlling the at least two switch devices.

In order to be able to safely switch off at least one electric drive, the safety relay module is adapted to provide a second, low level control signal and to feed the second control signal to the control line of the mounting rail bus system via the first bus interface if the emergency stop command device has been actuated, wherein the processing device of the at least one safety motor starter module is adapted to evaluate a second, low level control signal that is transferred via the control line, and in response to the second, low level control signal to generate control signals for opening the at least two switch devices in order to safely switch off an electric drive connected to the at least one safety motor starter module.

According to a favorable embodiment it is contemplated that the at least one safety motor starter module has a fourth connection element to which a higher-level control device is connectable, wherein the higher-level control device is able to provide control signals for the safety motor starter module to start or switch off an electric drive connected to the at least one motor starter module. It should be mentioned that the control signals of the higher-level control device are not transferred via the mounting rail bus system.

According to an advantageous embodiment, the processing device of the at least one safety motor starter module is adapted to evaluate and process the control signals of the higher-level control device connected to the safety motor starter module only if a first, high level control signal as transferred via the control line is applied at the input of the processing device.

A compact design with simplified wiring can be achieved when the mounting rail bus system comprises a third bus connector that can be electrically and mechanically coupled to the at least two bus connectors and is adapted to be arranged in the mounting rail and has a module interface. The power supply device is in the form of a power supply module and has a third bus interface which is adapted to be electrically connected to the module interface of the third bus connector. In the connected state, the power supply module is electrically connected to the two power supply lines of the mounting rail bus system and is able to apply a DC supply voltage to the two power supply lines.

Thanks to the special modular structure and the fact that the safety relay module generates a common control signal for a plurality of safety motor starter modules, the modular switch apparatus can be easily scaled. For this purpose, a fourth bus connector having a module interface and a further safety motor starter module can be installed, which has the following features:

a fourth bus interface adapted to be electrically connected to the module interface of the fourth bus connector, wherein, in the connected state, the further safety motor starter module is electrically connected to the two power supply lines and to the control line of the mounting rail bus system;

a fifth connection element to which a power supply device is connectable for providing a supply voltage for a further electric drive;

a sixth connection element for connecting a further electric drive;

at least one current path including at least two series-connected switch devices which are arranged between the fifth and sixth connection device; and a processing device having an input that is electrically connectable to the control line via the fourth bus interface, wherein the processing device is adapted to evaluate a first, high level control signal that is transferred via the control line and to provide control signals for controlling the at least two switch devices.

Preferably, the bus connectors are each in the form of a T-shaped connectors.

A mounting rail bus system with such a T-shaped connector is known from Applicant's DE 20 2006 006 659 U1, for example.

Favorably, the safety relay module may include a power supply unit which is connected to the first bus interface and which down converts a DC supply voltage as conveyed via the two power supply lines of the mounting rail bus system to a predefined DC voltage for powering the safety relay module. Similarly, the at least one safety motor starter module may include a power supply unit connected to the second bus interface, which down converts a DC supply voltage as conveyed via the two power supply lines of the mounting rail bus system to a predefined DC voltage for powering the safety motor starter module.

BRIEF DESCRIPTION OF THE DRAWINGS

The invention will now be explained in more detail by way of an exemplary embodiment in conjunction with the accompanying drawings, wherein:

FIG. 2 shows the modular switch apparatus of FIG. 1 with the modules thereof snap-fitted next to one another on the mounting rail bus system;

FIG. 3b shows a perspective view of the front side of the bus connector shown in FIG. 3a.

DETAILED DESCRIPTION

Figure 1:
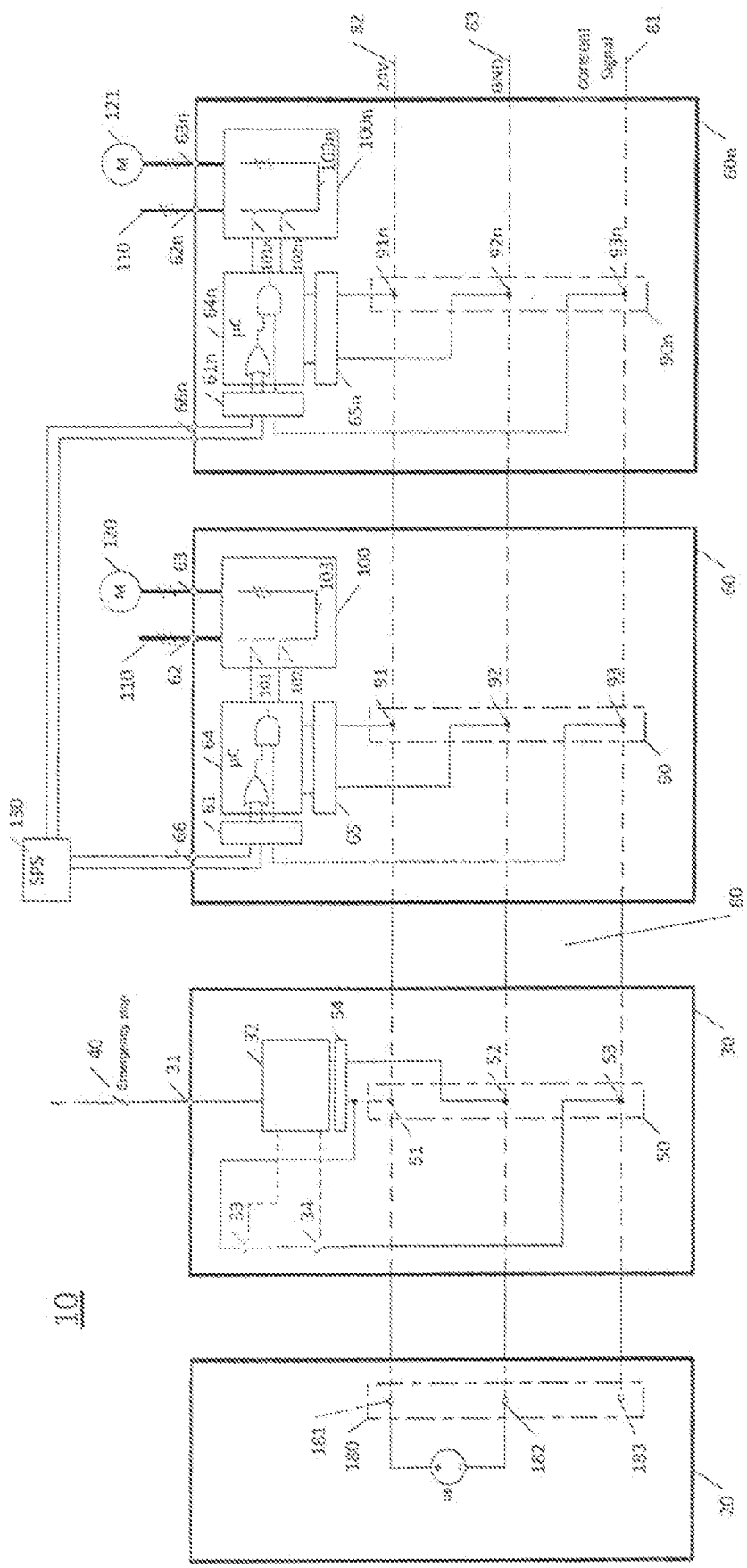
FIG. 1 is a schematic view of an exemplary modular switch apparatus.

FIG. 1 shows a block diagram schematically illustrating an exemplary modular switch apparatus 10 for controlling at least one electric drive 120.

Figure 3A:
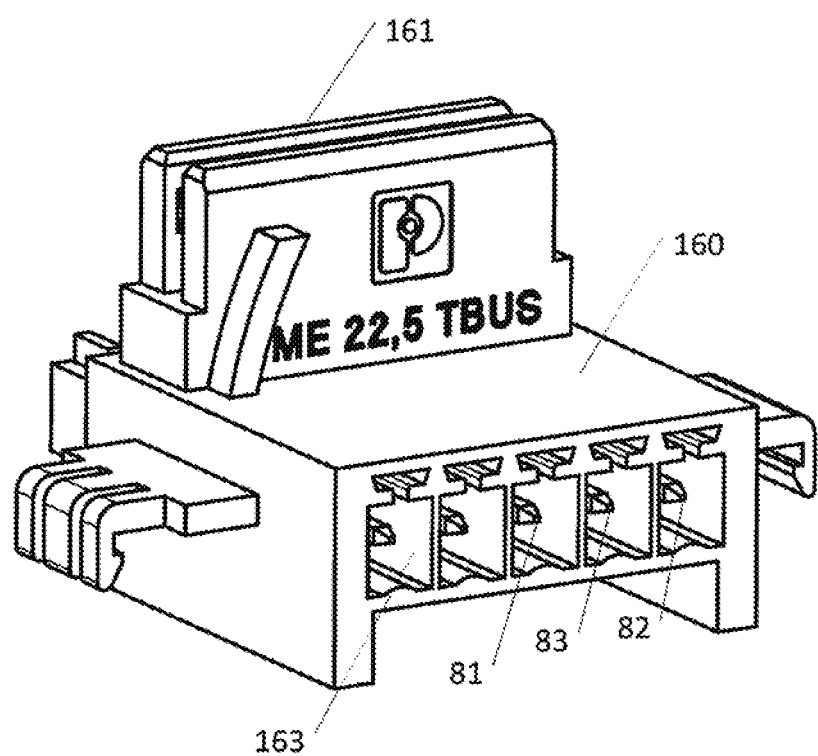
FIG. 3a shows a perspective view of the rear side of a bus connector shown in FIG. 2.

Modular switch apparatus 10 comprises a mounting rail bus system 80, as schematically illustrated in FIG. 2. The mounting rail bus system 80 comprises a mounting rail 84 and at least two bus connectors, namely a first bus connector 140 and a second bus connector 150, the at least two bus connectors 140, 150 being adapted to be coupled to one another electrically and mechanically and to be arranged in the mounting rail 84. This state is shown in FIG. 2. In the mounted state, the mounting rail bus system 80 provides a control line 81 and two power supply lines 82 and 83. As can be seen in FIG. 3a, the exemplary mounting rail bus system 80 comprises five bus lines, of which only bus lines 81, 82, and 83 are relevant for the invention and therefore shown in FIG. 1. Each one of the at least two bus connectors 140 and 150 has a module interface, 141 and 151, respectively, which in turn can be seen in FIG. 2.

One known exemplary embodiment of the mounting rail bus system 80 is known from DE 20 2006 006 659 U1 and is shown there in FIG. 1, for example. For a detailed exemplary description of the at least two bus connectors 140 and 150, reference is made to this document. The bus connector is referred to as a coupling part or connecting part in this document.

Figure 3B:
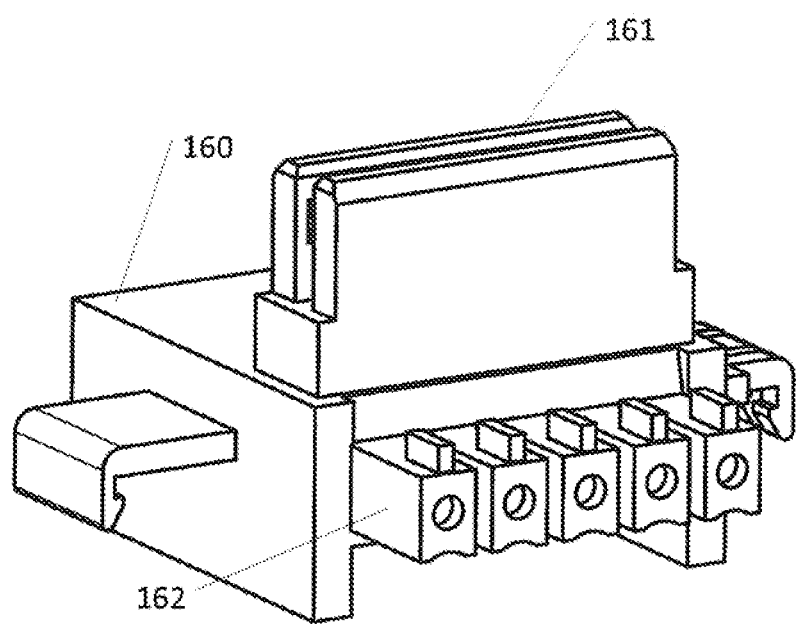

FIGS. 3a and 3b illustrate an exemplary configuration of bus connector 160, with FIG. 3a showing the rear view, and FIG. 3b showing the front view of the bus connector 160. In order to be able to be electrically and mechanically coupled to other bus connectors, for example to bus connector 140, the bus connector 160 has a first coupling interface 163 in which the contact pins of the bus lines are shown. Control line 81 and the two power supply lines 82 and 83 or the contact pins connected to these lines are shown in FIG. 3a. A module interface 161 is also shown. It should already be mentioned at this point that the bus connectors 140, 150, and 170, which can also be seen in FIG. 2, can be configured identically. In the illustrated example, they are identical.

For mechanical and electrical coupling, the front side of bus connector 160 has a further coupling interface 162 in the form of female connectors and is adapted to receive the contact pins of a complementary coupling interface of another bus connector.

It should also be noted that the bus connectors in FIG. 1 are arranged below the respective modules and are therefore not visible.

The modular switch apparatus 10 furthermore comprises a power supply device 20 which is adapted to apply a DC supply voltage UB to the two power supply lines 82 and 83 of the mounting rail bus system 80. It should be mentioned that the power supply device 20 may be a separate standard power supply unit which can be electrically connected to the contact pins of the bus connector 140 associated with the power supply lines 82 and 83. Alternatively, and as shown in the figures, the power supply device 20 may be in the form of a power supply module which can be snap-fitted onto a further bus connector, in the illustrated example to bus connector 160.

The modular switch apparatus 10 furthermore comprises a safety relay module 30. Safety relay module 30 comprises a first connection element 31 to which an emergency stop command device 40 is connectable. For the sake of simplicity, the emergency stop command device 40 is only represented by a switch symbol. Furthermore, safety relay module 30 comprises a first bus interface 50 adapted to be electrically connected to the module interface 141 of the first bus connector 140. In a manner known per se, the first bus interface 50 may comprise a printed circuit board with contact areas which are electrically connected to corresponding contacts of the module interface 141 when being snap-fitted onto the module interface 141 of bus connector 140 so as to be electrically connected to the bus lines, in particular to control line 81 and to power supply lines 82 and 83. In other words, in the mounted state, the safety relay 30 is electrically connected to the bus connector 140, i.e. to the two power supply lines 82 and 83 and to the control line 81 of mounting rail bus system 80.

As furthermore illustrated in FIG. 1, the bus interface 50 of safety relay module 30 has at least three contacts 51 to 53, which in the snap-fitted state establish an electrical connection to control line 81 and to the two power supply lines 82 and 83, via the contacts of module interface 141 of bus connector 140. As mentioned before, the exemplary mounting rail bus system 80 comprises five bus lines, of which only the bus lines 81 to 83 are important here. That is why only three contacts of the bus interface 50 are illustrated.

Safety relay module 30 is adapted to obtain a first, high level control signal which will also be referred to as a consent signal below, from a DC supply voltage UB applied to the two power supply lines 82 and 83, and to feed the first control signal to the control line 81 via first bus interface 50 or via contact 53 if the emergency stop command device 40 has not been actuated. In order to be able to carry out this function, the safety relay module 30 may comprise an evaluation and control unit 32 which is connected to the first connection element 31 on its input end. Furthermore, the safety relay module 30 preferably has two series-connected switch devices 33 and 34 which are connected to contacts 51 and 53 of bus interface 50 and thus to the power supply line 82 to which the positive potential of power supply device 20 is applied, and to control line 81. If the emergency stop command device 40 has not been actuated, i.e. the symbolic switch is open, the evaluation and control device 32 will ensure that the two switch devices 33 and 34 are closed and thus the high level positive potential applied to power supply line 82 is applied to control line 81 via contact 53, as the first control signal. Favorably, the safety relay module 30 may comprise a power supply unit 54 that is connected to contacts 51 and 52 in order to convert the operating voltage of, e.g., 24 volts as applied to power supply lines 82 and 83 into a lower DC voltage which can be used to power the evaluation and control unit 32.

The modular switch apparatus 10 furthermore comprises at least one safety motor starter module 60. The safety motor starter module 60 has a second bus interface 90 which may again comprise a printed circuit board with connection contacts in order to allow the safety motor starter module 60 to be connected to the bus lines. The second bus interface 90 is configured to be electrically connected to the module interface 151 of bus connector 150, and in the coupled state the electrical contacts of the bus interface are connected to the corresponding electrical contacts of the module interface 151. Since we are only interested in bus lines 81 to 83, as already mentioned above, only contacts 91 to 93 of bus interface 90 are shown in FIG. 1, which, in the snap-fitted state, will be connected to power supply lines 82 and 83 and to control line 81 via the respective contacts of the module interface 151. In other words: in the connected state, the safety motor starter module 60 is electrically connected to the two power supply lines 82 and 83 and to control line 81 of mounting rail bus system 80 via bus connector 150.

The safety motor starter module 60 furthermore has a second connection element 62, to which a power supply means 110 is connectable for providing a supply voltage for the electric drive 120. Power supply means 110 may be a three-phase network, for example. In this case, the electric drive 120 may be a three-phase motor, for example.

The second connection element 62 thus has three connections to which the three phases of the exemplary three-phase network 110 can be applied. Furthermore, a third connection element 63 is provided to which the electric drive 120 is connectable. In the illustrated example, the third connection element 63 also has three connections. In order to be able to connect the electric drive 120 to the three-phase network 110, a power output stage 100 is preferably provided, which comprises at least one current path 103 including at least two series-connected switch devices 101 and 102, and the at least one current path 103 is arranged between connection element 62 and connection element 63. In the discussed example, the power output stage 100 includes three current paths, each of which includes at least two switch devices connected in series.

In order to be able to control power output stage 100, the safety motor starter module 60 comprises a processing device 64 which may be in the form of a microcontroller, for example. Processing device 64 has an input which is electrically connectable to the control line 81 via bus interface 90, i.e. via contact 93. The processing device 64 is in particular configured to evaluate a first, high level control signal which has been provided by safety relay module 30 and transferred via control line 81, and to provide control signals for controlling the at least two switch devices 101 and 102. In order to be able to power the processing device 64, the contacts 91 and 92 of bus interface 90 can be electrically connected to a power supply unit 65 which converts the DC power supply voltage UB as conveyed via power supply lines 82 and 83 into an appropriately lower DC voltage for powering the processing device 64.

The safety motor starter module 60 may have a fourth connection element 66 to which a higher-level control device 130 is connectable. The higher-level control device 130 may be a programmable logic controller (PLC). The higher-level control device 130 is in particular configured to provide control signals for the safety motor starter module 60 to start or switch off the electric drive 120 connected to the connection element 63. The higher-level control device 130 may, for example, have two channels, so that the connection element 66 has two connections in order to be able to receive the two redundant control signals from higher-level control device 130. The control signals from the higher-level control device and the control signals conveyed via control line 81 can be applied to the respective inputs of processing device 64 either directly or in an electrically isolated manner, for example via an optocoupler 61.

As mentioned before, the power supply device 20 may be in the form of a power supply module. In order to provide for a compact set up that is simple in terms of wiring, the mounting rail bus system 80 may comprise a third bus connector, namely bus connector 160 which is adapted for being electrically and mechanically coupled to the bus connectors 140 and 150 and to be fitted into the mounting rail 84. An exemplary embodiment of bus connector 160 has already been discussed above in conjunction with FIGS. 3a and 3b.

The power supply device 20 in the form of a power supply module includes a bus interface 180 which is adapted to be electrically connected to the module interface 161 of the third bus connector 160. Similarly to what was described before, the bus interface 180 may likewise include a printed circuit board with contacts that is connectable to corresponding contacts of the module interface 161. Since we are only interested in bus lines 81 to 83, only the contacts 181 to 183 of bus interface 180 are shown in FIG. 1. In its connected state, the power supply module 20 will be snap-fitted onto bus connector 160 which is electrically and mechanically coupled to bus connector 140, and the power supply module 20 will be electrically connected to the two power supply lines 82 and 83 of mounting rail bus system 80 so that the DC supply voltage UB provided by power supply device 20 can be applied to the two power supply lines 82 and 83.

An advantage of the modular switch apparatus 10 can be seen in the fact that it can be scaled easily by connecting further safety motor starter modules 60$n$. To this end, a further safety motor starter module 60$n$ only has to be connected via a further bus connector 170 and, optionally, has to be connected to the higher-level control device.

It should be noted that in the illustrated exemplary embodiment the safety motor starter module 60 and the further safety motor starter module 60$n$ can be configured identically. A more detailed description of safety motor starter module 60$n$ and its coupling to the mounting rail bus system 80 can therefore be dispensed with.

The further safety motor starter module 60$n$ allows to connect a further electric drive 121 to the power supply means 110. Control signals for starting and switching on the electric drive 121 are applied to the connection element 66$n$ of the further safety motor starter module 60$n$ by higher-level control device 130. It should be mentioned that the control signal provided by the safety relay module 30 is supplied to both the safety motor starter module 60 and to the further safety motor starter module 60$n$ via control line 81. Reference numeral 60$n$ signals that further safety motor starter modules are connectable to the modular switch apparatus 10, all of which will receive the same control signal from safety relay module 30.

It should also be mentioned that only the control signal generated by safety relay module 30 is transferred to the safety motor starter modules 60 and 60$n$ via a bus line, namely control line 81 of the mounting rail bus system. The control signals from higher-level control device 130 are transmitted to each of the safety motor starter modules 60 and 60$n$ via a separate transfer path, as shown in FIG. 1.

FIG. 2 shows the exemplary modular switch apparatus 10 in its mounted state. FIG. 2 shows the mounting rail bus system 80 on which the power supply device 20, the safety relay module 30 and the two safety motor starter modules 60 and 60$n$ are arranged through bus connectors 160, 140, 150, and 170.

The operation principle of modular switch apparatus 10 as schematically shown in FIG. 1 will now be explained in more detail.

Assuming first, that the symbolic switch, i.e. the emergency stop command device 40 connected to safety relay module 30, has not been actuated. Accordingly, the potential which is applied to power supply line 82 and also applied to contact 51 of bus interface 50, is transferred, as a high level control signal, to the control line 81 of mounting rail bus system 80, via the closed switch devices 33 and 34 and via contact 53 of bus interface 50, and is supplied, via contact 93 of bus interface 90 of safety motor starter module 60 or via contact 93$n$ of bus interface 90$n$, to processing device 64, and to processing device 64$n$, directly or via optocoupler 61 and via optocoupler 61$n$, respectively. It should be mentioned that the processing device 64 of safety motor starter module 60 and the processing device 64$n$ of safety motor starter module 60$n$ are each configured to evaluate and process the control signals from higher-level control device 130 connected to the respective motor starter module 60 or 60$n$ only if a first, high level control signal as transferred via control line 81 is applied at the inputs of processing device 64 and of processing device 64$n$. In this case, the higher-level control device 130 will be able to, for example, start or switch off the electric drive 120 and the electric drive 121 independently of one another.

According to an exemplary embodiment, the processing devices 64 and 64$n$ are each adapted to logically combine the multi-channel control signals from higher-level control device 130 and the control signals transferred via control line 81. For example, the two control signals from higher-level control device 130 are combined by an OR gate, and the output signal of the OR gate is fed to a downstream AND gate which has the control signal as transferred via control line 81 applied to its second input.

Assuming now, that the emergency stop command device 40 has been actuated, which corresponds to an open switch. The activation of the emergency stop command device 40 is detected by the evaluation and control unit 32 which then generates two control signals for opening the switch devices 33 and 34. In response thereto, the electrical connection between contact 51 and contact 53 is opened, so that the safety relay module 30 applies a second, low-level control signal to the control line 81 of the mounting rail bus system. In this case, the second control signal corresponds to a 0 volt signal. The two processing devices 64 and 64$n$ are each adapted to evaluate the second control signal transferred via control line 81 and, in response to the second control signal, to generate control signals which open the switch devices of power output stage 100 and of power output stage 100$n$, respectively, i.e. at least switch devices 101 and 102 or 101$n$ and 102$n$, as shown in FIG. 1, so that the electric drive 120 connected to safety motor starter module 60 and the electric drive 121 connected to safety motor starter module 60$n$ are safely switched off. For this purpose, as already stated above, the processing devices 64 and 64$n$ are each able to supply the two control signals from the higher-level control device 130 to the OR gate and to feed the output signal of the OR gate together with the second control signal to the AND gate. If the second control signal is 0, for example, the processing devices 64 and 64$n$ will ensure that the electric drives 120 and 121 are safely disconnected, regardless of the control command from higher-level control device 130.

LIST OF REFERENCE NUMERALS

10 Modular switch apparatus
20 Power supply device, e.g. power supply module
30 Safety relay module
31 First connection element for connecting an emergency stop command device
32 Evaluation and control unit
33, 34 Switch devices, e.g. electromechanical switches
40 Emergency stop command device
50 Bus interface of safety relay module 30
51-53 Contacts of bus interface 50
54 Power supply unit, e.g. switching power supply unit
60, 60$n$ Safety motor starter module
61, 61$n$ Optocoupler
62, 62$n$ Connection element for power supply means 110
63, 63$n$ Connection element for electric drive
64, 64$n$ Processing device, e.g. microcontroller
65, 65$n$ Power supply unit, e.g. switching power supply unit
66, 66$n$ Connection element for applying control signals from higher-level control device 130
80 Mounting rail bus system
81 Control line of mounting rail bus system
82, 83 Power supply lines of mounting rail bus system
84 Mounting rail
90, 90$n$ Bus interface of motor starter module 60 and 60$n$, respectively 91-93 Contacts of the bus interface of motor starter module 60
91n-93n Contacts of the bus interface of motor starter module 60n
100, 100n Power output stage of motor starter 60 and 60n, respectively
101, 102 Switch devices of power output stage 100, e.g. electromechanical switches
101n, 102n Switch devices of power output stage 100n, e.g. electromechanical switches
110 Power supply network, e.g. three-phase network
120, 121 Electric drive, e.g. three-phase motor
130 Higher level control device, e.g. multi-channel PLC
140-170 Bus connectors, e.g. T-shaped connectors
141-171 Module interface
162 First coupling interface
163 Second coupling interface
180 Bus interface of power supply device 20
181-183 Contacts of bus interface 180

The invention claimed is:

1. A modular switch apparatus for controlling at least one electric drive, the modular switch apparatus comprising:
a mounting rail bus system comprising a mounting rail and at least two bus connectors, namely a first and a second one, wherein the at least two bus connectors are adapted to be coupled to one another electrically and mechanically and to be arranged in the mounting rail and in their mounted state contain a control line and two power supply lines, wherein each of the at least two bus connectors has a module interface;
a power supply device adapted to apply a DC supply voltage to the two power supply lines of the mounting rail bus system;
a safety relay module including:
a first connection element to which an emergency stop command device is connectable;
a first bus interface adapted to be electrically connected to the module interface of the first bus connector
wherein, in the connected state, the safety relay module is electrically connected to the two power supply lines and to the control line of the mounting rail bus system;
wherein the safety relay module is adapted to obtain a first, high level control signal from a DC supply voltage applied to the two power supply lines and to feed the first control signal to the control line via the first bus interface if the emergency stop command device has not been actuated;
at least one safety motor starter module including:
a second bus interface adapted to be electrically connected to the module interface of the second bus connector,
wherein, in the connected state, the safety motor starter module is electrically connected to the two power supply lines and to the control line of the mounting rail bus system;
a second connection element to which a power supply means is connectable for providing a supply voltage for an electric drive;
a third connection element for connecting an electric drive;
at least one current path including at least two series-connected switch devices provided between the second and third connection element; and
a processing device having an input that is electrically connectable to the control line via the second bus interface, wherein the processing device is adapted to evaluate a first, high level control signal that is transferred via the control line and to provide control signals for controlling the at least two switch devices.

2. The modular switch apparatus of claim 1, wherein:
the safety relay module is adapted to provide a second, low level control signal and to feed the second control signal to the control line of the mounting rail bus system via the first bus interface, if the emergency stop command device has been actuated; wherein:
the processing device of the at least one safety motor starter module is adapted to evaluate a second, low level control signal transferred via the control line and, in response to the second, low level control signal, to generate control signals for opening the at least two switch devices in order to safely switch off an electric drive connected to the at least one safety motor starter module.

3. The modular switch apparatus of claim 1, wherein:
the at least one safety motor starter module has a fourth connection element to which a higher-level control device is connectable, wherein the higher-level control device is able to provide control signals for the safety motor starter module to start or switch off an electric drive connected to the at least one motor starter module.

4. The modular switch apparatus of claim 3, wherein:
the processing device of the at least one safety motor starter module is adapted to only evaluate and process the control signals of the higher-level control device connected to the safety motor starter module if a first, high level control signal as transferred via the control line is applied at the input of the processing device.

5. The modular switch apparatus of claim 1, wherein:
the mounting rail bus system has a third bus connector that can be coupled electrically and mechanically to the at least two bus connectors and is adapted to be arranged in the mounting rail and has a module interface; wherein:
the power supply device is in the form of a power supply module and has a third bus interface adapted to be electrically connected to the module interface of the third bus connector,
wherein, in the connected state, the power supply module is electrically connected to the two power supply lines of the mounting rail bus system and is able to apply a DC supply voltage to the two power supply lines.

6. The modular switch apparatus of claim 1, further comprising:
a fourth bus connector including a module interface; and
a further safety motor starter module including:
a fourth bus interface adapted to be electrically connected to the module interface of the fourth bus connector, wherein, in the connected state, the further safety motor starter module is electrically connected to the two power supply lines and to the control line of the mounting rail bus system;
a fifth connection element to which a power supply means is connectable for providing a supply voltage for a further electric drive;
a sixth connection element for connecting a further electric drive (121);
at least one current path including at least two series-connected switch devices provided between the fifth and sixth connection element; and
a processing device having an input that is electrically connectable to the control line via the fourth bus interface, wherein the processing device is adapted to evaluate a first, high level control signal that is transferred via the control line and to provide control signals for controlling the at least two switch devices.

7. The modular switch apparatus of claim 1, wherein:
the bus connectors are each in the form of a T-shaped connectors.

8. The modular switch apparatus of claim 1, wherein:
the safety relay module includes a power supply unit connected to the first bus interface, which down converts a DC supply voltage as conveyed via the two power supply lines of the mounting rail bus system to a predefined DC voltage for powering the safety relay module; and wherein:
the at least one safety motor starter module includes a power supply unit connected to the second bus interface, which down converts a DC supply voltage as conveyed via the two power supply lines of the mounting rail bus system to a predefined DC voltage for powering the safety motor starter module.

* * * * *